(12) United States Patent
Choi et al.

(10) Patent No.: US 9,710,020 B2
(45) Date of Patent: Jul. 18, 2017

(54) ROLLABLE DISPLAY APPARATUS

(71) Applicant: SAMSUNG DISPLAY CO., LTD., Yongin, Gyeonggi-Do (KR)

(72) Inventors: Kyungmin Choi, Seoul (KR); Hyunwoo Koo, Hwaseong-Si (KR); Taewoong Kim, Yongin-Si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 312 days.

(21) Appl. No.: 14/463,239

(22) Filed: Aug. 19, 2014

(65) Prior Publication Data
US 2015/0227171 A1    Aug. 13, 2015

(30) Foreign Application Priority Data
Feb. 12, 2014 (KR) .................. 10-2014-0016149

(51) Int. Cl.
*H05K 1/00* (2006.01)
*G06F 1/16* (2006.01)

(52) U.S. Cl.
CPC .................. *G06F 1/1652* (2013.01)

(58) Field of Classification Search
CPC .... G06F 1/652; G06F 1/1652; H04M 1/0268; G09F 9/301; H05K 1/028
See application file for complete search history.

(56) References Cited

U.S. PATENT DOCUMENTS

| 7,179,520 | B2 | 2/2007 | Saeki |
| 7,196,692 | B2 | 3/2007 | Mochizuki et al. |
| 7,710,370 | B2 | 5/2010 | Slikkerveer et al. |
| 8,001,711 | B2 | 8/2011 | LaFarre et al. |
| 8,035,577 | B2 | 10/2011 | LaFarre et al. |
| 2007/0216639 | A1* | 9/2007 | LaFarre .................. G02F 1/167 345/107 |
| 2008/0013292 | A1 | 1/2008 | Slikkerveer et al. |
| 2008/0049003 | A1* | 2/2008 | Hasegawa ............. G06F 1/1615 345/206 |
| 2013/0127799 | A1 | 5/2013 | Lee |
| 2016/0035812 | A1* | 2/2016 | Kwon ................. H01L 27/3276 257/40 |

FOREIGN PATENT DOCUMENTS

| JP | 2001-100661 | 4/2001 |
| KR | 10-0818170 | 3/2008 |
| KR | 10-2012-0014872 | 2/2012 |
| KR | 10-1301918 | 8/2013 |

OTHER PUBLICATIONS

English Abstract for Publication No. 10-2008-0091145 (for 10-1301918).

* cited by examiner

*Primary Examiner* — Steven T Sawyer
(74) *Attorney, Agent, or Firm* — F. Chau & Associates, LLC (57) ABSTRACT

A rollable display apparatus includes a flexible display panel and a housing. The flexible display panel includes a display region which displays an image and a dummy region which does not display an image. The dummy region is connected to a side of the display region, and the dummy region and the display region are disposed in one direction. The flexible display panel is rollable around an outside surface of the housing. The dummy region includes a first dummy portion fixed in the housing and a second dummy portion connected to the first dummy portion. The second dummy portion is wrapped around the housing.

24 Claims, 5 Drawing Sheets

ROLLABLE DISPLAY APPARATUS

CROSS-REFERENCE TO RELATED APPLICATION

This patent application claims priority under 35 U.S.C. §119 to Korean Patent Application No. 10-2014-0016149, filed on Feb. 12, 2014, the disclosure of which is hereby incorporated by reference herein in its entirety.

TECHNICAL FIELD

The present disclosure relates to rollable display apparatuses and, more particularly, to rollable display apparatuses with increased quality.

DISCUSSION OF THE RELATED ART

Flexible display apparatuses are being developed according to the demands of the market. The flexible display apparatuses may include, for example, a curved display apparatus fixed with a specific curvature, a foldable display apparatus bendable with a specific curvature radius or more or foldable on a folding axis, and a rollable display apparatus rollable with a specific curvature radius.

The rollable display apparatus has merits such as, for example, a wide display area and excellent portability, and thus, various research is being conducted for the rollable display apparatus.

In a general rollable display apparatus, a flexible display panel may be rolled on a housing. In this case, too much stress or nicks may occur in a portion of the flexible display panel, so defects may occur at pixels provided in the portion of the flexible display panel.

SUMMARY

Example embodiments of the inventive concept may provide rollable display apparatuses capable of preventing defects from occurring at pixels provided in a display region of flexible display panel which is rolled.

Embodiments of the inventive concept provide a rollable display apparatus including a flexible display panel and a housing.

The flexible display panel may include a display region which displays an image and a dummy region which does not display an image. The dummy region is connected to a side of the display region, and the display region and the dummy region are disposed in one direction.

The flexible display panel may be rollable around an outside surface of the housing.

The dummy region may include: a first dummy portion fixed in the housing, and a second dummy portion connected to the first dummy portion and wrapped around the housing.

The housing may have a cylindrical shape.

The housing may include a main housing and a sub-housing.

The main housing may have a cross section that is a shape obtained by removing a fan shape from a circle, and the sub-housing may have a cross section of a fan shape.

The second dummy portion may be combined with an inside surface of the main housing.

The sub-housing may be combined with the main housing in such a way that the inside surface of the main housing is opposite to the sub-housing with the first dummy portion therebetween.

The second dummy portion is wrapped around the housing at least once.

The second dummy portion may have a length in the one direction, and the length of the second dummy portion may be equal to or greater than a circumference of the housing.

The flexible display panel may include an insulating substrate, an image display part, a polarization film, and a passivation film. The image display part may be disposed on the insulating substrate and may emit light or control incident light. The polarization film may be opposite to the insulating substrate with the image display part therebetween. The passivation film may be opposite to the image display part with the insulating substrate therebetween.

In example embodiments, the insulating substrate may include a display insulating substrate and a dummy insulating substrate. The display insulating substrate may overlap with the display region. The dummy insulating substrate may overlap with the dummy region. The polarization film and the passivation film may overlap with the display region but may not overlap with the dummy region.

In example embodiments, the polarization film may include a display polarization film and a dummy polarization film. The display polarization film may overlap with the display region. The dummy polarization film may overlap with the dummy region. The insulating substrate and the passivation film may overlap with the display region but may not overlap with the dummy region.

In example embodiments, the passivation film may include a display passivation film and a dummy passivation film. The display passivation film may overlap with the display region. The dummy passivation film may overlap with the dummy region. The insulating substrate and the polarization film may overlap with the display region but may not overlap with the dummy region.

In example embodiments, the rollable display apparatus may further include: a dummy film overlapping with the dummy region. The insulating substrate, the polarization film, and the passivation film may overlap with the display region but may not overlap with the dummy region.

The dummy film may includes a first dummy film adhered to an end portion of a top surface of the polarization film adjacent to the dummy region, and a second dummy film adhered to an end portion of a bottom surface of the passivation film adjacent to the dummy region. In addition, portions of the first and second dummy films, which overlap with the dummy region, are adhered to each other.

The dummy film includes at least one selected from the group consisting of a polyester, a polystyrene, a polycarbonate, a polyether sulfone, a polyarylate, a polyimide, a polycycloolefin, a norbornen resin, and a poly(chlorotrifluoroethylene). The polyester is selected from the group consisting of a polyethylene terephthalate, a polybutylene phthalate, and a polyethylene naphthalate.

Embodiments of the inventive concept provide a rollable display apparatus. The rollable display apparatus includes a flexible display panel and a housing.

The flexible display panel includes: a display region which displays an image and a dummy region which does not display an image, with the dummy region connected to a side of the display region, and the display region and the dummy region being disposed adjacent to each other in one direction parallel to a long side of the flexible display panel, an insulating substrate which includes a transparent material and is flexible, an image display part disposed on the insulating substrate and which is configured to emit light or control incident light, a polarization film which is transparent and flexible and disposed opposite to the insulating substrate with the image display part therebetween, and a passivation film opposite to the image display part with the insulating substrate therebetween.

One of the insulating substrate, the polarization film, or the passivation film has a first width in the one direction, in which the first width is equal to a sum of a width in the one direction of the display region and a width in the one direction of the dummy region, and the other two of the insulating substrate, the polarization film, or the passivation film have a second width in the one direction, in which the second width is equal to the width in the one direction of the display region.

The housing has an outside surface around which the flexible display panel is rollable.

The dummy region includes a first dummy portion fixed in the housing, and a second dummy portion connected to the first dummy portion and wrapped around the housing at least once. The display region is in contact with the second dummy portion but the display region is not in contact with the outside surface of the housing.

BRIEF DESCRIPTION OF THE DRAWINGS

Example embodiments of the inventive concept can be understood in more detail from the following detailed description taken in conjunction with the attached drawings in which.

DETAILED DESCRIPTION OF EXAMPLE EMBODIMENTS

Example embodiments of the inventive concept will now be described more fully hereinafter with reference to the accompanying drawings, in which example embodiments of the inventive concept are shown. It should be noted, however, that example embodiments of the inventive concept are not limited to the following example embodiments, and may be implemented in various forms. In the drawings, embodiments of the inventive concept are not limited to the specific examples provided herein and may be exaggerated for clarity.

Like reference numerals designate like elements throughout the specification. It will be understood that when an element such as a layer, film, region, or substrate is referred to as being "on" another element, it can be directly on the other element or intervening elements may also be present.

As used herein, the singular forms, "a", "an", and "the" are intended to include plural forms as well, unless the context clearly indicates otherwise.

Figure 1:
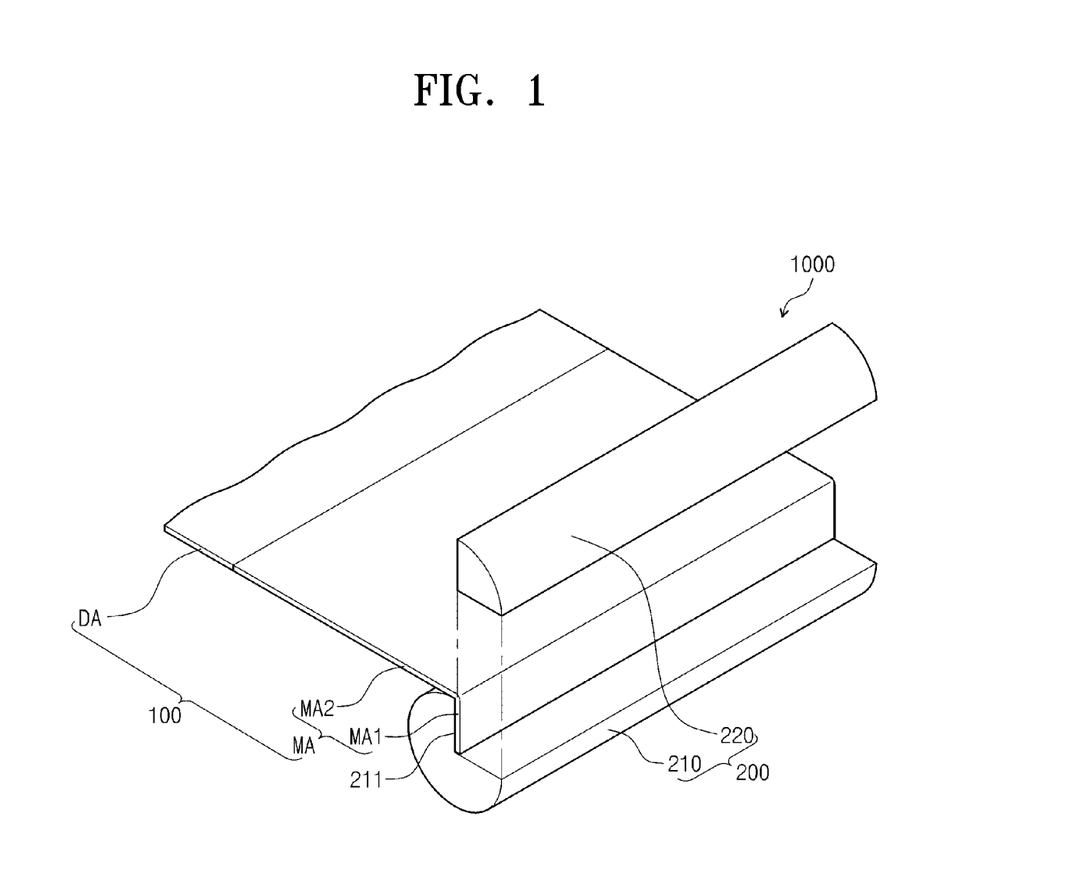
FIG. 1 is a perspective view showing a rollable display apparatus according to an example embodiment of the inventive concept.
Figure 2:
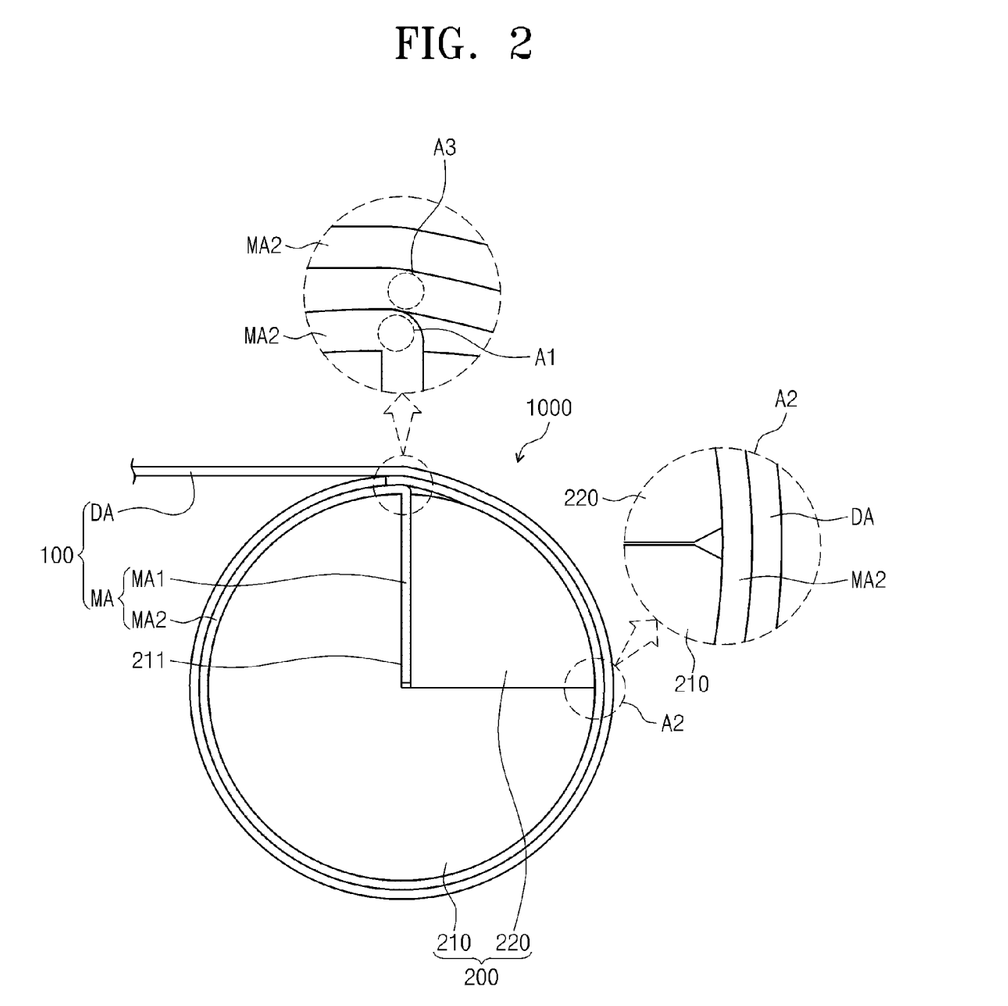
FIG. 2 is a side view showing the rollable display apparatus of FIG. 1.
Figure 3:
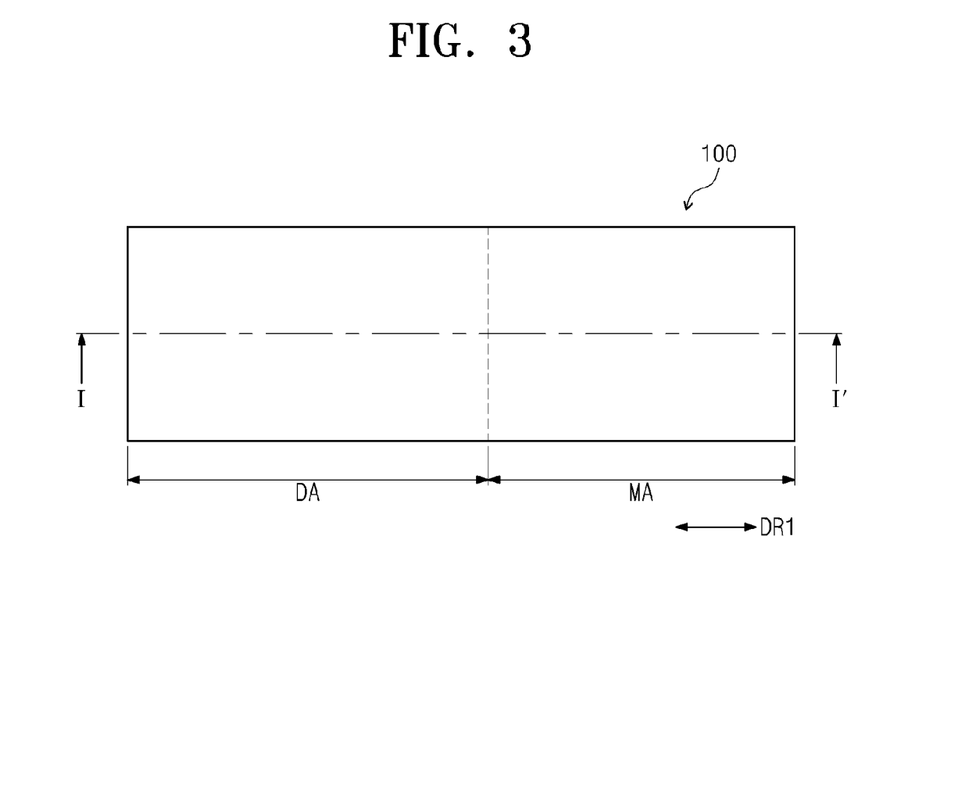
FIG. 3 is a plan view showing the rollable display apparatus of FIG. 1.

FIG. 1 is a perspective view showing a rollable display apparatus 1000 according to an example embodiment of the inventive concepts. FIG. 2 is a side view showing the rollable display apparatus 1000 of FIG. 1. FIG. 3 is a plan view showing the rollable display apparatus 1000 of FIG. 1.

Referring to FIGS. 1 to 3, the rollable display apparatus 1000 includes a flexible display panel 100 and a housing 200.

The flexible display panel 100 includes, for example, a display region DA and a dummy region MA. The display region DA displays an image. The dummy region MA is connected to a side of the display region DA and does not display an image. The flexible display panel 100 has, for example, a rectangular shape when viewed from a plan view. The display region DA and the dummy region MA may be, for example, adjacent to each other in one direction DR1 parallel to a long side of the flexible display panel 100. In other words, the display region DA and the dummy region MA may be arranged in the one direction DR1.

The flexible display panel 100 may use a substrate formed of a flexible material, so it may be flexible.

The dumpy region MA may include, for example, a first dummy portion MA1 and a second dummy portion MA2. The first dummy portion MA1 may be fixed in the housing 200. The second dummy portion MA2 may wrap around the housing 200. For example, the second dummy portion MA2 may be wrapped around the housing 200 at least once.

The housing 200 functions as a wrap core around which the flexible display panel 100 is rolled. The housing 200 may have, for example, a cylindrical shape.

The rollable display apparatus 1000 may be operated to be rolled or unrolled. In the rolled state, the flexible display panel 100 may be rolled around an outer surface of the housing 200. In the unrolled state, the flexible display panel 100 may be unrolled in a direction opposite to the rolled direction of the flexible display panel 100.

The housing 200 may include, for example, a main housing 210 and a sub-housing 220. The main housing 210 may have, for example, a pillar-shape of which a cross section has a shape obtained by removing a fan shape from a circle. The second dummy portion MA2 may be, for example, combined with an inside surface 211 of the main housing 210 in a face-to-face combination. For example, the second dummy portion MA2 may be combined with the inside surface 211 of the main housing 210 by an adhesive or a joining member (e.g., a screw).

The sub-housing 220 may have, for example, a pillar shape having a cross-section of a fan shape. The sub-housing 220 is combined with the main housing 210 in such a way that, for example, the inside surface 211 of the main housing 211 is opposite to the sub-housing 220 with the first dummy portion MA1 therebetween. A cross-section of the combined structure of the main housing 210 and the sub-housing 220 may be, for example, a circular shape. For example, the cross section of the main housing 210 may have a first fan shape of which a center angle is greater than 180 degrees, and the cross section of the sub-housing 220 may have a second fan shape of which a center angle is smaller than 180 degrees. A sum of the center angles of the first and second fan shapes may be, for example, 360 degrees.

As the main housing 210 is joined to the sub-housing 220, the flexible display panel 100 may be more firmly fixed in the housing 200.

However, example embodiments of the inventive concept are not limited to the aforementioned shape of the housing 200. In other words, the housing 200 may have one of various shapes under the condition that the flexible display panel 100 is fixed in the housing 200. For example, alternatively in an embodiment, the housing may have a cylindrical shape including a groove which is formed in the outside surface of the cylindrical shape along its height direction, and the second dummy portion MA2 may be inserted into the groove so as to be fixed in the housing.

The second dummy portion MA2 has a length in the one direction DR1. The length of the second dummy portion MA2 is, for example, equal to or greater than the circumference of the housing 200. As the second dummy portion MA2 is wrapped around the housing at least once in the rolled state, the display region DA is in contact with the second dummy portion MA2 but is not in contact with the outside surface of the housing 200.

A portion 'A1' of FIG. 2 is a boundary region between the first dummy portion MA1 and the second dummy portion MA2. A severe bending phenomenon may occur between the first dummy portion MA1 and the second dummy portion MA2 of the flexible display panel 100. If a flexible display panel consists of only the display region DA without the first and second dummy portions MA1 and MA2, pixels overlapping with a place at which a bending phenomenon occurs may be damaged by a stress of the bending phenomenon. Thus, defects at pixels arranged in a line may occur.

However, according to example embodiments of the inventive concept, the flexible display panel 100 includes the first dummy portion MA1 and the second dummy portion MA2 and the bending phenomenon occurs at the second dummy region MA2 not displaying an image. Thus, the above-mentioned difficulties occurring in the portion 'A1' may be prevented.

A portion 'A2' of FIG. 2 is a boundary region between the main housing 210 and the sub-housing 220. If the main housing 210 and the sub-housing 220 are formed individually, a crevice may occur between the main housing 210 and the sub-housing 220 by edge-polishing. If a flexible display panel consists of only the display region DA without the first and second dummy portions MA1 and MA2, pixels overlapping with the crevice may be damaged to cause defects at pixels arranged in a line.

According to embodiments of the inventive concept, the flexible display panel 100 includes the first and second dummy portions MA1 and MA2 and the second dummy region MA2 not displaying an image overlaps with the crevice between the main housing 210 and the sub-housing 220. Thus, the above-mentioned difficulties occurring in the portion 'A2' may be prevented.

A portion 'A3' of FIG. 2 is a portion of the second dummy portion MA2 overlapping with the boundary region between the first dummy portion MA1 and the second dummy portion MA2. A height difference corresponding to a thickness of the flexible display panel 100 may occur between a left region and a right region at both sides of the first dummy portion MA1 in a region in which the first dummy portion MA1 and the second dummy portion MA2 are connected to each other. If a flexible display panel consists of only the display region DA without the first and second dummy portions MA1 and MA2, pixels overlapping with the region in which the height difference occurs may be damaged to cause defects at pixels arranged in a line.

According to embodiments of the inventive concept, the flexible display panel 100 includes the first and second dummy portions MA1 and MA2 and the second dummy region MA2 not displaying an image is wrapped around the housing at least once. Thus, the above-mentioned difficulties occurring in the portion 'A3' may be prevented.

Figure 4:
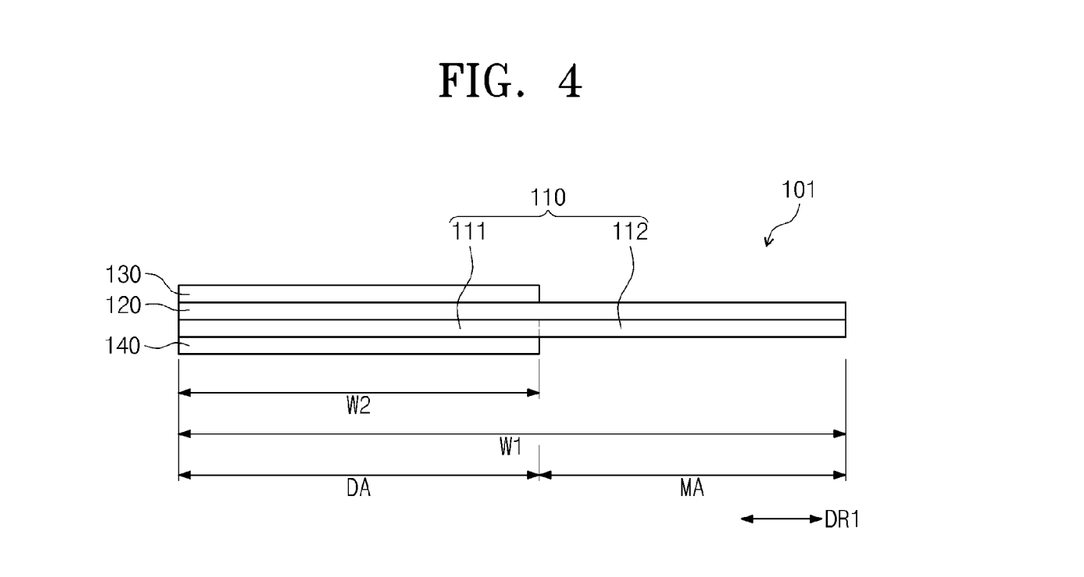
FIG. 4 is a cross-sectional view taken along a line I-I' of FIG. 3 to illustrate a rollable display apparatus according to an example embodiment of the inventive concept.

FIG. 4 is a cross-sectional view taken along a line I-I' of FIG. 3 to illustrate a rollable display apparatus according to an embodiment of the inventive concept.

Referring to FIG. 4, a flexible display panel 101 may include, for example, an insulating substrate 110, an image display part 120, a polarization film 130, and a passivation layer 140.

The insulating substrate 110 may be, for example, a flexible substrate formed of a transparent material. For example, the insulating substrate 110 may be formed of polyimide, polyethersulfone, polyethylenenaphthalate, polyethylene, polyvinyl chloride, polyethylene terephthalate, or combinations thereof.

The insulating substrate 110 includes, for example, a display insulating substrate 111 overlapping with the display region DA, and a dummy insulating substrate 112 overlapping with the dummy region MA. The insulating substrate 110 may have a first width W1 in the one direction DR1. The first width W1 may be, for example, equal to a sum of a width in the one direction DR1 of the display region DA and a width in the one direction DR1 of the dummy region MA.

The image display part 120 may emit light or may control incident light. The image display part 120 may at least one of various kinds of display devices usable in the flexible display apparatus. For example, the image display part 120 may include at least one of an electrophoresis display device, an electro-wetting display device, or an organic light emitting device. Hereinafter, the image display part 120 including the organic light emitting device will be described as an example.

In addition, the image display part 120 may include an anode electrode, an organic light emitting layer, and a cathode electrode. In the image display part 120, holes injected from the anode electrode are combined with electrons injected from the cathode electrode to form excitons. The image display part 120 emits light by energy generated when the excitons are transited from an excited state to a ground state. For example, the anode electrode of the image display part 120 may be made of transparent conductive materials such as Indium Tin Oxide (ITO), Indium Zinc Oxide (IZO) or the like.

The organic light emitting layer of the image display part 120 may be formed of an organic compound including, for example, a polymer organic compound. The organic light emitting layer may be formed of a single layer or multiple layers.

The cathode electrode of the image display part 120 may be formed of, for example, a conductive material having a relatively high reflectance. For example, the cathode electrode may be formed of a reflective metal such as aluminum (Al), silver (Ag), magnesium (Mg), barium (Ba), combinations thereof or the like.

The image display part 120 may be disposed on the insulating substrate 110. The image display part 120 may be disposed to, for example, overlap with the display insulating substrate 111 and the dummy insulating substrate 112. Alternatively, the image display part 120 may overlap with, for example, the display insulating substrate 111 but may not overlap with the dummy insulating substrate 112.

The polarization film 130 is disposed to be opposite to the insulating substrate 110 with the image display part 120 therebetween. The polarization film 130 may suppress refection of external light and may increase the side visibility of an image.

The polarization film 130 may be formed of, for example, a plurality of transparent flexible films that are sequentially stacked. Thus, the polarization film 130 may be transparent and flexible.

The polarization film 130 may overlap with, for example, the display region DA but may not overlap with the dummy region MA. The polarization film 130 may have a second width W2 in the one direction DR1. The second width W2 may be, for example, equal to the width in the one direction DR1 of the display region DA.

The passivation film 140 is disposed to be opposite to the image display part 120 with the insulating substrate 110 therebetween. The passivation film 140 protects the insulating substrate 110 from an external impact.

The passivation film 140 may be formed of a material having a high transmittance. For example, the passivation film 140 may be formed of at least one of a polyester (e.g., a polyethylene terephthalate, a polybutylene phthalate, or a polyethylene naphthalate), a polystyrene, a polycarbonate, a polyether sulfone, a polyarylate, a polyimide, a polycycloolefin, a norbornen resin, or a poly(chlorotrifluoroethylene).

The passivation film 140 may overlap with, for example, the display region DA but may not overlap with the dummy region MA. The passivation film 140 may have the second width W2 in the one direction DR1.

Also, the flexible display panel 101 may further include, for example, a touch panel and a window member. The touch panel may be disposed on the polarization film 130, and the window member may be disposed on the touch panel. The touch panel may sense a spot at which a touch event occurs, and the window member may protect the touch panel.

In the rollable display apparatus according to the present embodiment of the inventive concept, the width of the insulating substrate 110 may be, for example, greater than the widths of the polarization film 130 and the passivation film 140 in the one direction DR1 for the formation of the dummy region MA.

Figure 5:
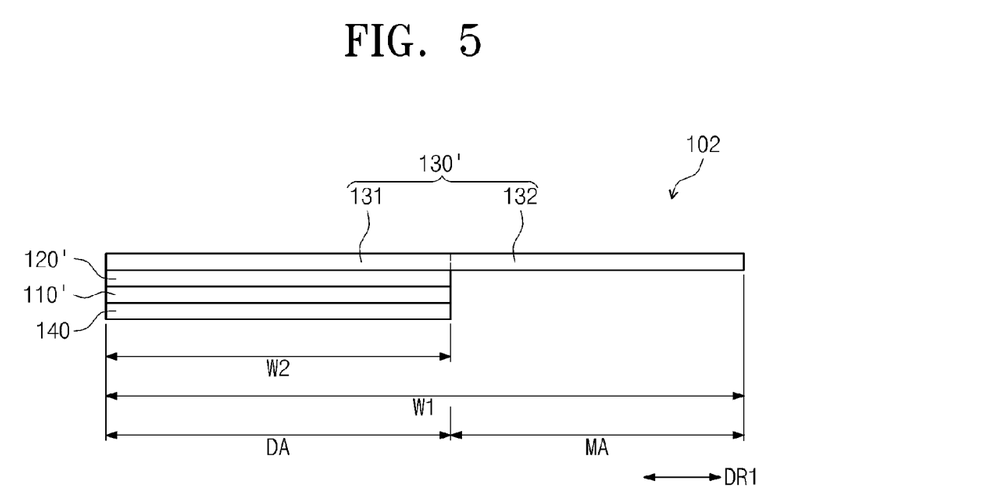
FIG. 5 is a cross-sectional view taken along a line I-I' of FIG. 3 to illustrate a rollable display apparatus according to an example embodiment of the inventive concept.

FIG. 5 is a cross-sectional view taken along a line I-I' of FIG. 3 to illustrate a rollable display apparatus according to an embodiment of the inventive concept.

Hereinafter, differences between a flexible display panel 102 of FIG. 5 and the flexible display panel 101 of FIG. 4 will be mainly described. In the present embodiment, the same descriptions as described with reference to FIG. 4 will be omitted or mentioned briefly for the purpose of ease and convenience in explanation.

The flexible display panel 102 of FIG. 5 may include, for example, an insulating substrate 110', an image display part 120', a polarization film 130', and a passivation film 140.

The insulating substrate 110' may overlap with, for example, the display region DA but may not overlap with the dummy region MA. The insulating substrate 110' may have a second width W2 in the one direction DR1. The second width W2 may be, for example, equal to a width in the one direction DR1 of the display region DA.

The image display part 120' may be disposed on the insulating substrate 110'.

The polarization film 130' may include, for example, a display polarization film 131 overlapping with the display region DA and a dummy polarization film 132 overlapping with the dummy region MA. The polarization film 130' may have a first width W1 in the one direction DR1. The first width W1 may be, for example, equal to a sum of the width in the one direction DR1 of the display region DA and a width in the one direction DR1 of the dummy region MA.

The passivation film 140 may, for example, overlap with the display region DA but may not overlap with the dummy region MA. The passivation film 140 may have the second width W2 in the one direction DR1.

In the rollable display apparatus according to the present embodiment of the inventive concept, the width of the polarization film 130' may be, for example, greater than the widths of the insulating substrate 110' and the passivation film 140 in the one direction DR1 for the formation of the dummy region MA.

Figure 6:
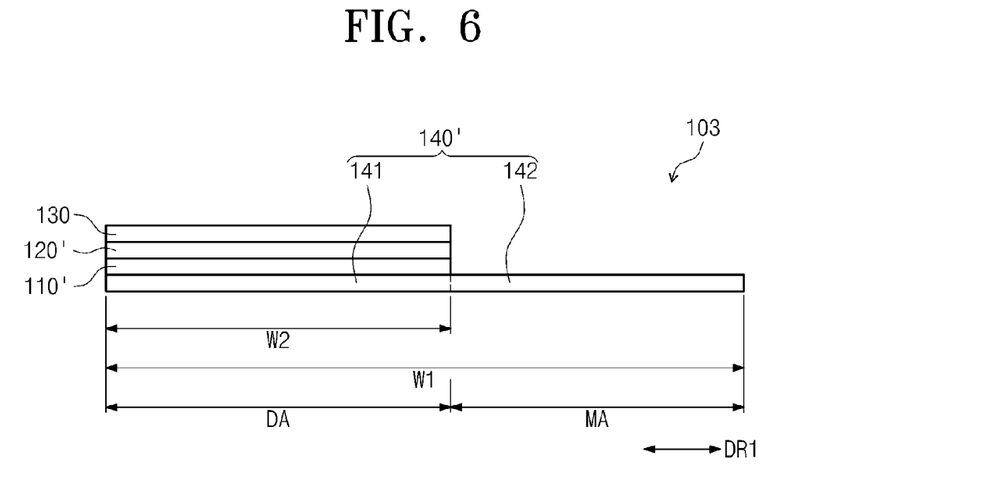
FIG. 6 is a cross-sectional view taken along a line I-I' of FIG. 3 to illustrate a rollable display apparatus according to an example embodiment of the inventive concept.

FIG. 6 is a cross-sectional view taken along a line I-I' of FIG. 3 to illustrate a rollable display apparatus according to an embodiment of the inventive concepts.

Hereinafter, differences between a flexible display panel 103 of FIG. 6 and the flexible display panel 101 of FIG. 4 will be mainly described. In the present embodiment, the same descriptions as described with reference to FIG. 4 will be omitted or mentioned briefly for the purpose of ease and convenience in explanation.

The flexible display panel 103 of FIG. 6 may include, for example, an insulating substrate 110', an image display part 120', a polarization film 130, and a passivation film 140'.

The insulating substrate 110' may, for example, overlap with the display region DA but may not overlap with the dummy region MA. The insulating substrate 110' may have a second width W2 in the one direction DR1. The second width W2 may be, for example, equal to a width in the one direction DR1 of the display region DA.

The image display part 120' may be disposed on the insulating substrate 110'.

The polarization film 130 may, for example, overlap with the display region DA but may not overlap with the dummy region MA. The polarization film 130 may have the second width W2 in the one direction DR1.

The passivation film 140' may include, for example, a display passivation film 141 overlapping with the display region DA and a dummy passivation film 142 overlapping with the dummy region MA. The passivation film 140' may have a first width W1 in the one direction DR1. The first width W1 may be, for example, equal to a sum of the width in the one direction DR1 of the display region DA and a width in the one direction DR1 of the dummy region MA.

In the rollable display apparatus according to the present embodiment of the inventive concept, the width of the passivation film 140' may be, for example, greater than the widths of the insulating substrate 110' and the polarization film 130 in the one direction DR1 for the formation of the dummy region MA.

Figure 7:
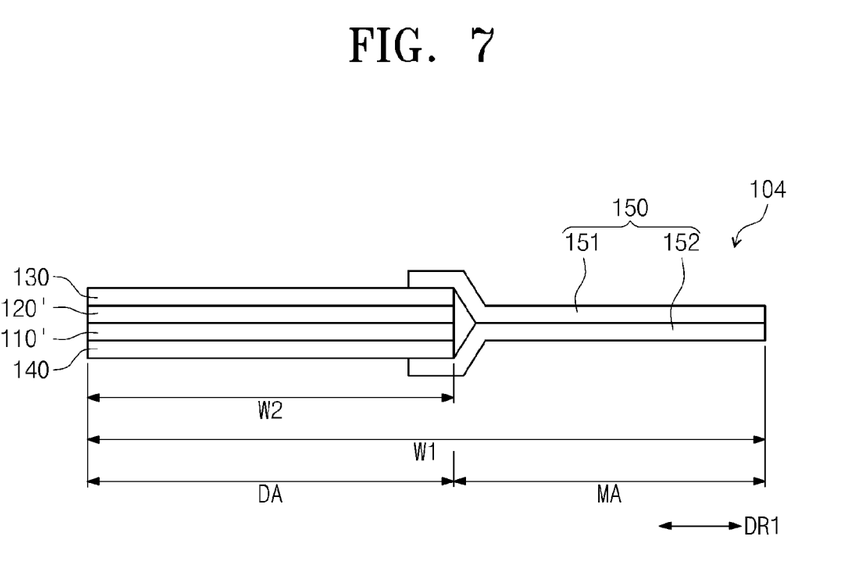
FIG. 7 is a cross-sectional view taken along a line I-I' of FIG. 3 to illustrate a rollable display apparatus according to an example embodiment of the inventive concept.

FIG. 7 is a cross-sectional view taken along a line I-I' of FIG. 3 to illustrate a rollable display apparatus according to an embodiment of the inventive concept.

Hereinafter, differences between a flexible display panel 104 of FIG. 7 and the flexible display panel 101 of FIG. 4 will be mainly described. In the present embodiment, the same descriptions as described with reference to FIG. 4 will be omitted or mentioned briefly for the purpose of ease and convenience in explanation.

The flexible display panel 104 of FIG. 7 may include, for example, an insulating substrate 110', an image display part 120', a polarization film 130, a passivation film 140, and a dummy film 150.

The insulating substrate 110' may, for example, overlap with the display region DA but may not overlap with the dummy region MA. The insulating substrate 110' may have a second width W2 in the one direction DR1. The second width W2 may be, for example, equal to a width in the one direction DR1 of the display region DA.

The image display part 120' may be disposed on the insulating substrate 110'.

The polarization film 130 may, for example, overlap with the display region DA but may not overlap with the dummy region MA. The polarization film 130 may have the second width W2 in the one direction DR1.

The passivation film 140 may, for example, overlap with the display region DA but may not overlap with the dummy region MA. The passivation film 140 may have the second width W2 in the one direction DR1.

The dummy film 150 may, for example, overlap with the dummy region MA. The dummy film 150 may include, for example, a first dummy film 151 and a second dummy film 152.

Portions of the passivation film 140, the insulating substrate 110', the image display part 120' and the polarization film 130, which are adjacent to the dummy region MA, may be disposed between a portion of the first dummy film 151 and a portion of the second dummy film 152.

The rest of the portions of the first and second dummy films 151 and 152, which overlap with the dummy region MA, may be in contact with each other.

The first dummy film 151 may be adhered to an end portion of a top surface of the polarization film 130, which is adjacent to the dummy region MA.

The second dummy film 152 may be adhered to an end portion of a bottom surface of the passivation film 140, which is adjacent to the dummy region MA.

An adhesive may be provided between the first dummy film 151 and the polarization film 130, between the second dummy film 152 and the passivation film 140, and between the first and second dummy films 151 and 152.

Each of the first and second dummy films 151 and 152 may be formed of a material having a high transmittance. For example, each of the first and second dummy films 151 and 152 may be a plastic film including at least one of a polyester (e.g., a polyethylene terephthalate, a polybutylene phthalate, or a polyethylene naphthalate), a polystyrene, a polycarbonate, a polyether sulfone, a polyarylate, a polyimide, a polycycloolefin, a norbornen resin, or a poly(chlorotrifluoroethylene).

The rollable display apparatus according to the present embodiment may further include the dummy film 150 to form the dummy region MA.

The rollable display apparatus according to embodiments of the inventive concepts may prevent the occurrence of defects at the pixels of the display region of the flexible display panel in the rolled state.

Having described example embodiments of the inventive concept, it is further noted that it is readily apparent to those of ordinary skill in the art that various modifications may be made without departing from the spirit and scope of the invention which is defined by the metes and bounds of the appended claims.

What is claimed is:

1. A reliable display apparatus comprising: a flexible display panel including a display region which displays an image and a dummy region which does not display an image; and a housing having an outside surface around which the flexible display panel is rollable, wherein the dummy region comprises: a first dummy portion fixed in the housing, and a second dummy portion connected to the first dummy portion and wrapped around the housing, wherein the housing has a cylindrical shape and the first dummy portion terminates at a center of the cylindrical housing, and the housing comprises: a main housing having a cross section that has a circular sector shape having a central angel that is greater than 180°; and a sub-housing that has a circular sector shape having a central angel that is less than 180°, wherein the first dummy portion is affixed to an inside surface of the main housing.

2. The reliable display apparatus of claim 1, wherein, the sub-housing is combined with the main housing in such a way that the sub-housing makes contact with the main housing at a first and second radius of the housing, and the first dummy portion is disposed between the sub-housing- and the main housing along the first radius while the sub-housing directly contacts, the main housing-along the second radius.

3. The reliable display apparatus of claim 1, wherein the second dummy portion is wrapped around the housing at least once.

4. The rollable display apparatus of claim 3, wherein the second dummy portion has a length in the one direction, and wherein the length of the second dummy portion is equal to or greater than a circumference of the housing.

5. A rollable display apparatus comprising:
a flexible display panel including a display region which displays an image and a dummy region which does not display an image, the dummy region connected to a side of the display region, and the display region and the dummy region disposed in one direction; and
a housing having an outside surface around which the flexible display panel is rollable, wherein the dummy region comprises: a first dummy portion fixed in the housing, and a second dummy portion connected to the first dummy portion and wrapped around the housing,
wherein the flexible display panel comprises:
an insulating substrate, an image display part disposed on the insulating substrate, the image display part configured to emit light or control incident light, a polarization film opposite to the insulating substrate with the image display part therebetween, and a passivation film opposite to the image display part with the insulating substrate therebetween.

6. The rollable display apparatus of claim 5, wherein the insulating substrate comprises: a display insulating substrate overlapping with the display region, and a dummy insulating substrate overlapping with the dummy region.

7. The rollable display apparatus of claim 6, wherein the polarization film and the passivation film overlap with the display region but do not overlap with the dummy region.

8. The rollable display apparatus of claim 5, wherein the polarization film comprises: a display polarization film overlapping with the display region, and a dummy polarization film overlapping with the dummy region.

9. The rollable display apparatus of claim 8, wherein the insulating substrate and the passivation film overlap with the display region but do not overlap with the dummy region.

10. The rollable display apparatus of claim 5, wherein the passivation film comprises: a display passivation film overlapping with the display region, and a dummy passivation film overlapping with the dummy region.

11. The rollable display apparatus of claim 10, wherein the insulating substrate and the polarization film overlap with the display region but do not overlap with the dummy region.

12. The rollable display apparatus of claim 5, further comprising: a dummy film overlapping with the dummy region.

13. The rollable display apparatus of claim 12, wherein the insulating substrate, the polarization film, and the passivation film overlap with the display region but do not overlap with the dummy region.

14. The rollable display apparatus of claim 13, wherein the dummy film comprises: a first dummy film adhered to an end portion of a top surface of the polarization film adjacent to the dummy region, and a second dummy film adhered to an end portion of a bottom surface of the passivation film adjacent to the dummy region.

15. The rollable display apparatus of claim 14, wherein portions of the first and second dummy films, which overlap with the dummy region, are adhered to each other.

16. The rollable display apparatus of claim 13, wherein the dummy film includes at least one selected from the group consisting of a polyester, a polystyrene, a polycarbonate, a polyether sulfone, a polyarylate, a polyimide, a polycycloolefin, a norbornen resin, and a poly(chlorotrifluoroethylene).

17. The rollable display apparatus of claim 16, wherein the polyester is selected from the group consisting of a polyethylene terephthalate, a polybutylene phthalate, and a polyethylene naphthalate.

18. The rollable display apparatus of claim 15, further comprising an adhesive disposed between the first dummy film and the polarization film, between the second dummy film and the passivation film, and between the portions of the first and second dummy films adhered to each other and overlapping with the dummy region.

19. A rollable display apparatus comprising:
a flexible display panel including:
a display region which displays an image and a dummy region which does not display an image, the dummy region connected to a side of the display region, and wherein the display region and the dummy region are disposed adjacent to each other in one direction parallel to a long side of the flexible display panel,
an insulating substrate which includes a transparent material and is flexible,
an image display part disposed on the insulating substrate, the image display part is configured to emit light or control incident light,
a polarization film which is transparent and flexible and disposed opposite to the insulating substrate with the image display part therebetween, and
a passivation film opposite to the image display part with the insulating substrate therebetween,
wherein one of the insulating substrate, the polarization film, or the passivation film has a first width in the one direction, in which the first width is equal to a sum of a width in the one direction of the display region and a width in the one direction of the dummy region, and
wherein the other two of the insulating substrate, the polarization film, or the passivation film have a second width in the one direction, in which the second width is equal to the width in the one direction of the display region; and
a housing having an outside surface around which the flexible display panel is rollable, wherein the dummy region comprises:
a first dummy portion fixed in the housing, and a second dummy portion connected to the first dummy portion and wrapped around the housing at least once, and wherein the display region is in contact with the second dummy portion but the display region is not in contact with the outside surface of the housing.

20. The rollable display apparatus of claim 19, wherein the image display part has one of the first width in the one direction or the second width in the one direction.

21. The rollable display apparatus of claim 20, wherein the insulating substrate and the image display part each have the first width in the one direction, and wherein the polarization film and the passivation film each have the second width in the one direction.

22. The rollable display apparatus of claim 20, wherein the polarization film has the first width in the one direction, and wherein each of the insulating substrate, the image display part, and the passivation film have the second width in the one direction.

23. The rollable display apparatus of claim 20, wherein the passivation film has the first width in the one direction, and wherein each of the insulating substrate, the image display part, and the polarization film have the second width in the one direction.

24. A rollable display apparatus comprising: a flexible display panel including a display region which displays an image and a dummy region which does not display an image, the dummy region connected to a side of the display region, and the display region and the dummy region disposed in one direction; and a cylindrical housing having an outside surface around winch the flexible display panel is rollable, wherein the dummy region comprises: a first dummy portion fixed in the housing, and a second dummy portion connected to the first dummy portion and wrapped around the housing, and wherein the second dummy portion is at least as long as a circumference of the housing, wherein the housing has a cylindrical shape and the first dummy portion terminates at a center of the cylindrical housing, and the housing comprises: a main housing having a cross section that has a circular sector shape having a central angel that is greater than 180°; and a sub-housing that has a circular sector shape having a central angel that is less than 180°, wherein the first dummy portion is affixed to an inside surface of the main housing.

* * * * *